(12) United States Patent
Wang et al.

(10) Patent No.: US 11,113,829 B2
(45) Date of Patent: Sep. 7, 2021

(54) DOMAIN ADAPTATION FOR ANALYSIS OF IMAGES

(71) Applicants: GM GLOBAL TECHNOLOGY OPERATIONS LLC, Detroit, MI (US); CARNEGIE MELLON UNIVERSITY, Pittsburgh, PA (US)

(72) Inventors: Jinsong Wang, Troy, MI (US); Yang Zou, Pittsburgh, PA (US); Guangyu J. Zou, Warren, MI (US); Vijayakumar Bhagavatula, Pittsburgh, PA (US)

(73) Assignees: GM GLOBAL TECHNOLOGY OPERATIONS LLC, Detroit, MI (US); CARNEGIE MELLON UNIVERSITY, Pittsburgh, PA (US)

( * ) Notice: Subject to any disclaimer, the term of this patent is extended or adjusted under 35 U.S.C. 154(b) by 122 days.

(21) Appl. No.: 16/545,674

(22) Filed: Aug. 20, 2019

(65) Prior Publication Data
US 2021/0056718 A1 Feb. 25, 2021

(51) Int. Cl.
*G06T 7/50* (2017.01)
*G06T 5/50* (2006.01)
*G06K 9/00* (2006.01)

(52) U.S. Cl.
CPC ............ *G06T 7/50* (2017.01); *G06K 9/00791* (2013.01); *G06T 5/50* (2013.01); *G06T 2207/20081* (2013.01); *G06T 2207/20084* (2013.01)

(58) Field of Classification Search
CPC ... G06T 7/50; G06T 5/50; G06T 2207/20081; G06T 2207/20084; G06K 9/00791
See application file for complete search history.

(56) References Cited

U.S. PATENT DOCUMENTS

| | | | | |
|---|---|---|---|---|
| 10,839,262 | B2 * | 11/2020 | Keserich | ............... G06N 20/00 |
| 2018/0114332 | A1 * | 4/2018 | Desai | ...................... G06N 5/04 |

\* cited by examiner

*Primary Examiner* — Bobbak Safaipour
(74) *Attorney, Agent, or Firm* — Cantor Colburn LLP (57) ABSTRACT

A system for analyzing images includes a processing device including a receiving module configured to receive an image associated with a target domain, and a domain adaptation module configured to characterize one or more features represented in the received image based on a domain adaptation model. The domain adaptation model is generated using a machine learning algorithm to train the domain adaptation model, and the machine learning algorithm is configured to train the domain adaptation model based on one or more source domain images associated with a source domain, one or more previously acquired images associated with the target domain, and acquired characterization data associated with the target domain. The system also includes an output module configured to output the received image with characterization data identifying one or more features characterized by the domain adaptation module.

20 Claims, 5 Drawing Sheets

DOMAIN ADAPTATION FOR ANALYSIS OF IMAGES

INTRODUCTION

The subject disclosure relates to the art of image analysis and, more particularly, to a system and method for training a classification model and characterizing images in different domains.

Modern vehicles are increasingly equipped with cameras and/or other imaging devices and sensors to facilitate vehicle operation and increase safety. Cameras can be included in a vehicle for various purposes, such as increased visibility and driver awareness, assisting a driver and performing vehicle control functions. Autonomous control of vehicles is becoming more prevalent, and autonomous control systems are equipped with the capability to identify environmental objects and features using cameras and other sensors, such as radar sensors.

SUMMARY

In one exemplary embodiment, a system for analyzing images includes a processing device including a receiving module configured to receive an image associated with a target domain, and a domain adaptation module configured to characterize one or more features represented in the received image based on a domain adaptation model. The domain adaptation model is generated using a machine learning algorithm to train the domain adaptation model, and the machine learning algorithm is configured to train the domain adaptation model based on one or more source domain images associated with a source domain, one or more previously acquired images associated with the target domain, and acquired characterization data associated with the target domain. The system also includes an output module configured to output the received image with characterization data identifying one or more features characterized by the domain adaptation module.

In addition to one or more of the features described herein, the source domain includes at least one of a first geographic scenario and a first temporal scenario, and the target domain includes at least one of a second geographic region and a second temporal scenario.

In addition to one or more of the features described herein, the source domain is associated with data acquired via a first modality and the target domain is associated with data associated with a second modality.

In addition to one or more of the features described herein, the data associated with the first modality includes optical image data, and the data associated with the second modality includes optical image data and ground truth data acquired from another sensor.

In addition to one or more of the features described herein, the processing module is configured to train the domain adaptation model by acquiring the one or more source domain images and one or more source domain characterization labels associated with the one or more source domain images, classifying features and generating a pseudo label having a first level of confidence based on a first model, applying the acquired characterization data to the first model to generate an updated model, and generating a second pseudo label having a second level of confidence, the second level of confidence being greater than the first level of confidence.

In addition to one or more of the features described herein, the acquired characterization data includes ground truth data acquired from one or more sensors.

In addition to one or more of the features described herein, the processing module is configured to train the domain adaptation model by acquiring depth data associated with the target image in the target domain, applying the acquired depth data to the updated model, and generating a third pseudo label having a third level of confidence that is greater than the second level of confidence.

In addition to one or more of the features described herein, the processing module is configured to train the domain adaptation module using a multi-task learning algorithm, the multi-task learning algorithm configured perform a first task that includes characterizing the one or more features based on image data, and a second task that includes characterizing the one or more features based on additional data in the target domain.

In addition to one or more of the features described herein, the acquired characterization data is selected from at least one of radar data and lidar data.

In addition to one or more of the features described herein, the machine learning algorithm is a deep learning algorithm configured to cause the processor to generate the domain adaptation model using a neural network.

In one exemplary embodiment, a method of analyzing images includes receiving an image associated with a target domain, and characterizing one or more features represented in the received image by a domain adaptation module based on a domain adaptation model. The domain adaptation model is generated using a machine learning algorithm to train the domain adaptation model, and the machine learning algorithm is configured to train the domain adaptation model based on one or more source domain images associated with a source domain, one or more previously acquired images associated with the target domain, and acquired characterization data associated with the target domain. The method also includes outputting the received image with characterization data identifying one or more features characterized by the domain adaptation module.

In addition to one or more of the features described herein, the source domain includes at least one of a first geographic scenario and a first temporal scenario, and the target domain includes at least one of a second geographic region and a second temporal scenario.

In addition to one or more of the features described herein, the source domain is associated with data acquired via a first modality and the target domain is associated with data associated with a second modality.

In addition to one or more of the features described herein, the data associated with the first modality includes optical image data, and the data associated with the second modality includes optical image data and ground truth data acquired from a sensor.

In addition to one or more of the features described herein, the method includes training the domain adaptation model. The training includes acquiring the one or more source domain images and one or more source domain characterization labels associated with the one or more source domain images, classifying features and generating a pseudo label having a first level of confidence based on a first model, applying the acquired characterization data to the first model to generate an updated model, and generating a second pseudo label having a second level of confidence, the second level of confidence being greater than the first level of confidence.

In addition to one or more of the features described herein, the acquired characterization data includes ground truth data acquired from one or more sensors.

In addition to one or more of the features described herein, training the domain adaptation model includes acquiring depth data associated with the target image in the target domain, applying the acquired depth data to the updated model, and generating a third pseudo label having a third level of confidence that is greater than the second level of confidence.

In addition to one or more of the features described herein, the method includes training the domain adaptation model using a multi-task learning algorithm. The multi-task learning algorithm is configured to perform a first task that includes characterizing the one or more features based on image data, and a second task that includes characterizing the one or more features based on additional data in the target domain.

In addition to one or more of the features described herein, the acquired characterization data is selected from at least one of radar data and lidar data.

In addition to one or more of the features described herein, the machine learning algorithm is a deep learning algorithm configured to cause the processor to generate the domain adaptation model using a neural network.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems for image analysis are described herein. An embodiment of an imaging and detection system is configured to receive image data from an imaging device (e.g., a camera) associated with a first domain, and to apply a domain adaptation model to the image data in order to identify and characterize one or more features depicted by the image. The domain adaptation model may be used to perform various analyses, such as labeling, semantic segmentation, image analysis, depth analysis, speed analysis and others.

The domain adaptation model is generated and/or updated using one or more machine learning algorithms. Examples of such algorithms include deep learning, supervised learning, unsupervised learning, semi-supervised learning, multi-task learning and others.

In one embodiment, the domain adaptation model is trained using a machine learning algorithm on labeled training data taken in a first domain (a "source domain"), and unlabeled training data taken in a second domain (a "target domain"). The trained model can then be used to classify, label or otherwise analyze other images in the target domain. A "domain" refers to a condition or scenario in which data is collected. Examples of domains include regional (geographic) domains, temporal domains and modality domains, which are discussed further below.

In one embodiment, the system is configured to train the domain adaptation model using camera images taken in the source domain and images taken in the target domain, as well as additional characterization data associated with the target domain. The additional characterization data may be acquired from modalities other than image modalities. Examples of other modalities include modalities associated with depth information, radar information, lidar (Light Detection and Ranging) information, surface normal information, and any other modalities capable of providing ground truth data related to the target domain.

Embodiments described herein present a number of advantages. The system provides an effective way to utilize models and data previously analyzed from other domains, and generalize the models to other domains. Currently, the perception performance of many imaging systems drops significantly due to changes in sensor sources (e.g., modalities) and domains. The system provides a highly adaptable domain adaptation framework that allows for utilizing multi-modal information in the training phase to allow imaging systems to adapt classification data from other domains and leverage additional sources of information.

Figure 1:
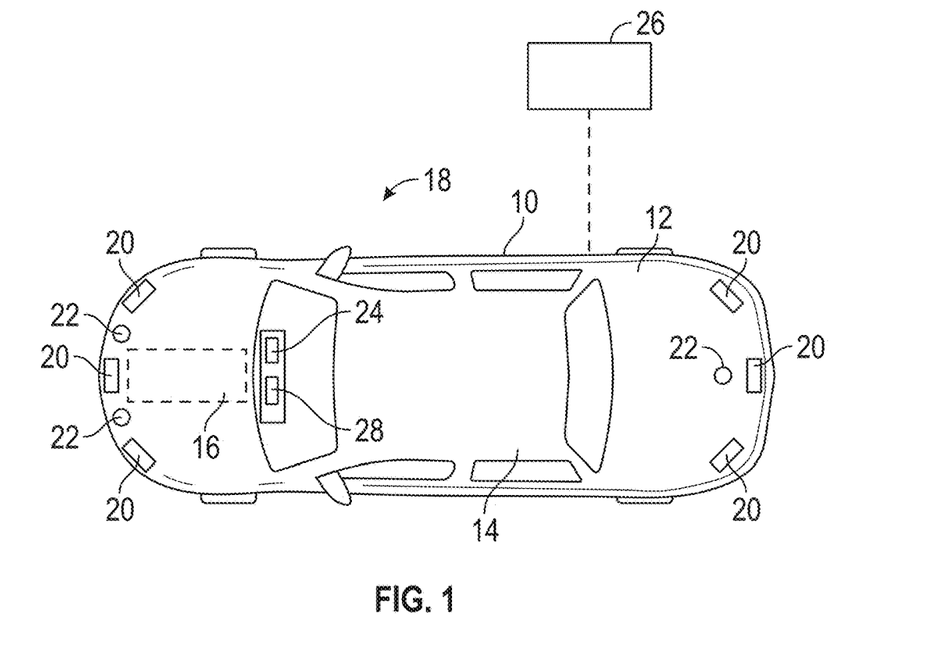
FIG. 1 is a top view of a motor vehicle including aspects of an image analysis system, in accordance with an exemplary embodiment.

FIG. 1 shows an embodiment of a motor vehicle 10, which includes a vehicle body 12 defining, at least in part, an occupant compartment 14. The vehicle body 12 also supports various vehicle subsystems including an engine assembly 16, and other subsystems to support functions of the engine assembly 16 and other vehicle components, such as a braking subsystem, a steering subsystem, a fuel injection subsystem, an exhaust subsystem and others.

One or more aspects of an image acquisition and analysis system 18 may be incorporated in or connected to the vehicle 10. The image analysis system 18 in this embodiment includes one or more optical cameras 20 configured to take images such as color (RGB) images. Images may be still images or video images. Additional devices or sensors may be included in the image analysis system 18. For example, one or more radar assemblies 22 may be included in the vehicle 10.

The cameras 20 and/or radar assemblies 22 communicate with one or more processing devices, such as an on-board processing device 24 and/or a remote processor 26, such as a processor in a mapping or imaging system. The vehicle 10 may also include a user interface system 28 for allowing a user (e.g., a driver or passenger) to input data, view images, view features identified by image analyses as discussed herein, and otherwise interact with a processing device and/or the image analysis system 18.

Figure 2:
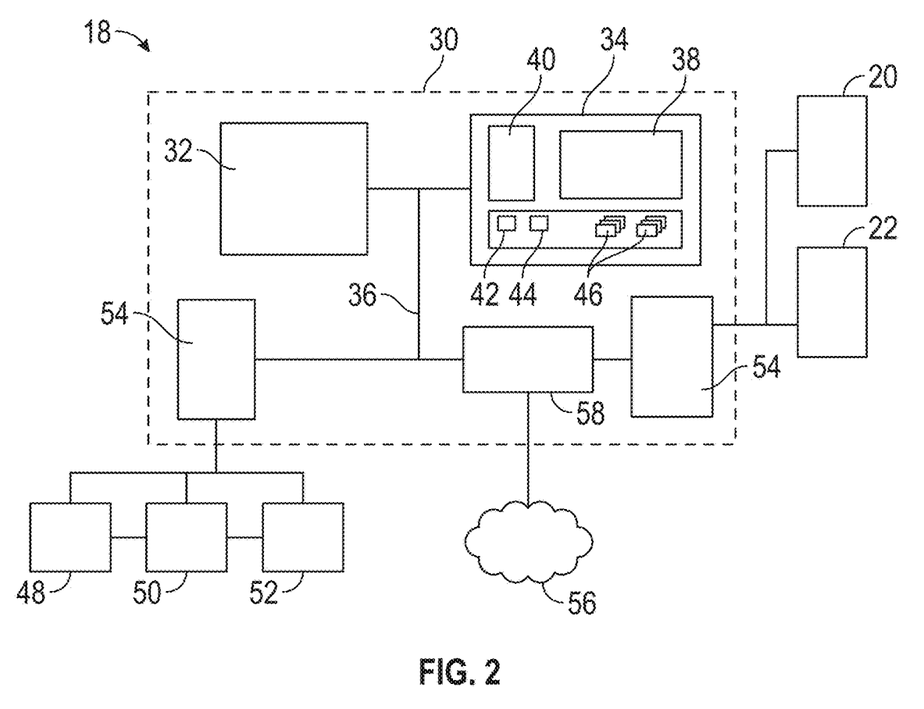
FIG. 2 depicts a computer system configured to perform aspects of image analysis, in accordance with an exemplary embodiment.

FIG. 2 illustrates aspects of an embodiment of a computer system 30 that is in communication with, or is part of, the image analysis system 18, and that can perform various aspects of embodiments described herein. The computer system 30 includes at least one processing device 32, which generally includes one or more processors for performing aspects of image acquisition and analysis methods described herein. The processing device 32 can be integrated into the vehicle 10, for example, as the on-board processor 24, or can be a processing device separate from the vehicle 10, such as a server, a personal computer or a mobile device (e.g., a smartphone or tablet). For example, the processing device 32 can be part of, or in communication with, one or more engine control units (ECU), one or more vehicle control modules, a cloud computing device, a vehicle satellite communication system and/or others. The processing device 32 may be configured to perform image detection and analysis methods described herein, and may also perform functions related to control of various vehicle subsystems.

Components of the computer system 30 include the processing device 32 (such as one or more processors or processing units), a system memory 34, and a bus 36 that couples various system components including the system memory 34 to the processing device 32. The system memory 34 may include a variety of computer system readable media. Such media can be any available media that is accessible by the processing device 32, and includes both volatile and non-volatile media, removable and non-removable media.

For example, the system memory 34 includes a non-volatile memory 38 such as a hard drive, and may also include a volatile memory 40, such as random access memory (RAM) and/or cache memory. The computer system 30 can further include other removable/non-removable, volatile/non-volatile computer system storage media.

The system memory 34 can include at least one program product having a set (e.g., at least one) of program modules that are configured to carry out functions of the embodiments described herein. For example, the system memory 34 stores various program modules that generally carry out the functions and/or methodologies of embodiments described herein. A receiving module 42 may be included to perform functions related to acquiring and processing received images and information from sensors, and an analysis or processing module 44 may be included to perform functions related to image analysis, such as executing machine learning algorithms, generating models and labeling images. The system memory 34 may also store various data structures 46, such as data files or other structures that store data related to image detection and analysis. Examples of such data structures include camera images, radar images, models, and labeled images. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 32 can also communicate with one or more external devices 48 such as a keyboard, a pointing device, and/or any devices (e.g., network card, modem, etc.) that enable the processing device 32 to communicate with one or more other computing devices. In addition, the processing device 32 can communicate with one or more devices such as the cameras 20 and the radar assemblies 22 used for image analysis. The processing device 32 can also communicate with other devices that may be used in conjunction with the image analysis, such as a Global Positioning System (GPS) device 50 and vehicle control devices or systems 52 (e.g., for driver assist and/or autonomous vehicle control). Communication with various devices can occur via Input/Output (I/O) interfaces 54.

The processing device 32 may also communicate with one or more networks 56 such as a local area network (LAN), a general wide area network (WAN), and/or a public network (e.g., the Internet) via a network adapter 58. It should be understood that although not shown, other hardware and/or software components could be used in conjunction with the computer system 30. Examples include, but are not limited to: microcode, device drivers, redundant processing units, external disk drive arrays, RAID systems, and data archival storage systems, etc.

Figure 3:
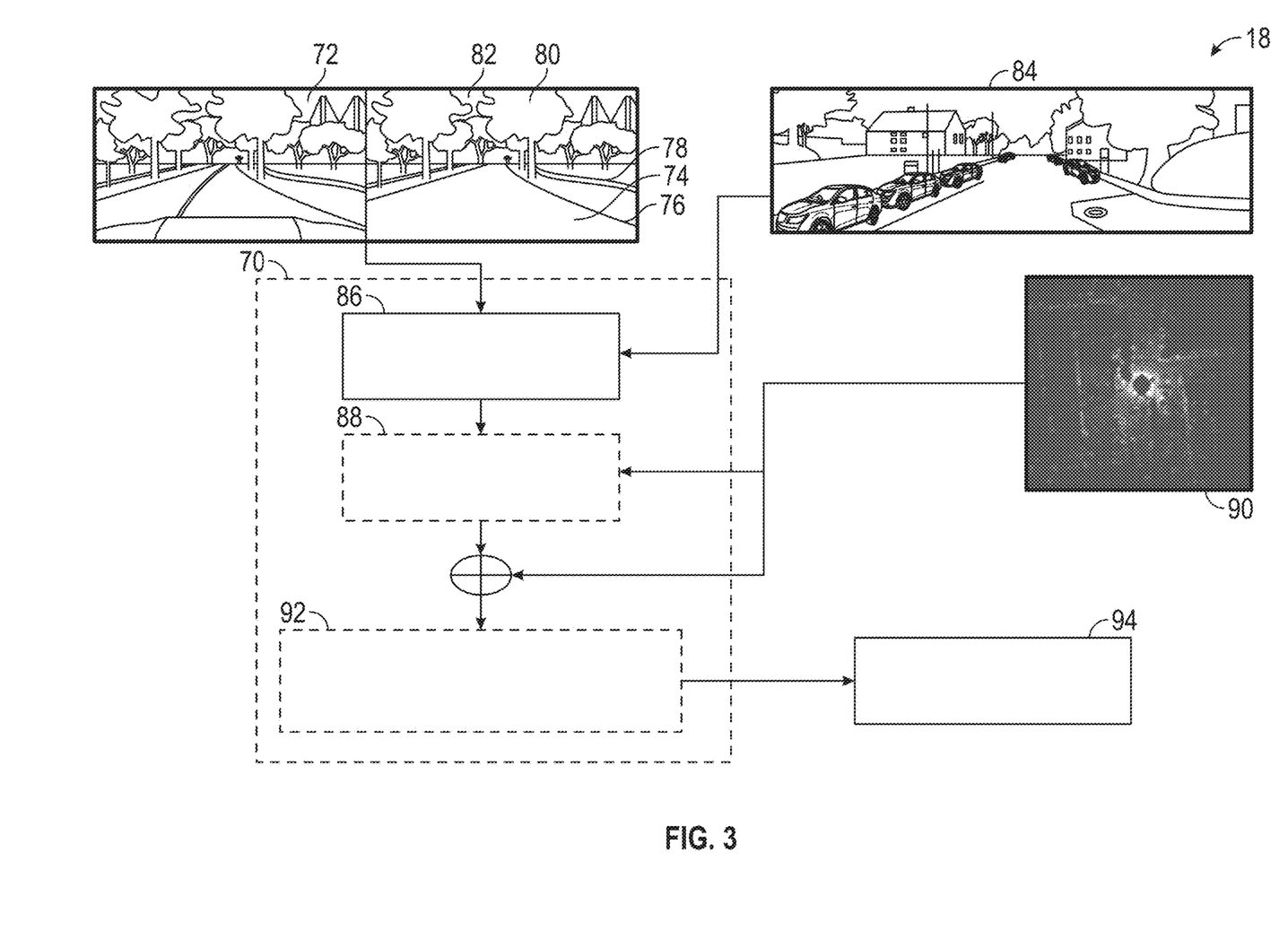
FIG. 3 depicts an image analysis system, in accordance with an exemplary embodiment.

FIG. 3 is a block diagram depicting aspects of an image analysis system and generation of a target domain model that can be used to classify and/or characterize image data and/or other data in a target domain.

In this embodiment, the system includes a domain adaptation module 70 that receives image data in the form of an image 72 (e.g., a red, green, blue or RGB image) taken in or associated with a first domain (a source domain), and source domain characterization data in the form of classification labels. The first or source domain in this embodiment is a first regional scenario and a first temporal scenario. A "temporal scenario" refers to the time, date, season or other temporal period in which data is acquired. A "regional scenario" refers to a geographic region (e.g., a geographic area, city, state, town, coordinates, etc.) in which data is acquired.

The domain adaptation module 70 may also receive characterization data associated with the source domain image 72 (referred to as "source domain characterization data"). For example, the characterization data includes classification labels, such as a road surface label 74, a grass label 76, a sidewalk label 78, a tree label 80 and a sky label 82. The labels in this example, are provided in the form of color coding or shading to denote the different labels, but may be presented in any suitable form.

The domain adaptation module 70 also receives image data in the form of an unlabeled image 84 taken in a target domain. The domain adaptation module 70 uses a machine learning algorithm that compares the source domain image 72 to the labels 74, 76, 78, 80 and/or 82 to build a model that can be used to identify features of images (e.g., via semantic segmentation) in the source domain. For example, geometric features including shape and size, as well as image recognition techniques, are used to identify and classify features in the image 72. The unlabeled image 84 is then used to adapt the model from the source domain to the target domain for classification of the image 84 and other images in the target domain.

For example, the domain adaptation module 70 includes domain adaptation logic 86 that constructs or updates a domain adaptation model that adapts identifiers or classification data derived from the source domain to the target domain.

In one embodiment, the analysis system 18 and/or the adaptation module 70 is configured to receive additional characterization data or other information acquired in the target domain to train the domain adaptation module and the machine learning algorithm. For example, the domain adaptation module 70 includes learning logic 88 that receives training data from sensors related to the target domain. An example of such training data is a radar or lidar image, such as a "bird's eye view" lidar image 90, which can be used to derive ground truth data. Ground truth data is information and data acquired by direct observation in a domain. Other examples of ground truth data include velocity information from speed cameras, infrared images, depth information and others.

The learning logic 88 incorporates the additional characterization data to improve adaptation to the target domain. In one embodiment, the domain adaptation module 70 and/or the learning logic 88 utilizes multi-task learning to generate or update the model. For example, the learning logic 88 trains the domain adaptation model using multi-task learning in conjunction with one or more neural networks such as a deep neural network (DNN). In this embodiment, multiple tasks are performed, such as a semantic segmentation task, a depth estimation task, a surface normal estimation task and/or other related tasks. Outputs of the DNN include labels or other indicators that classify objects or features, depth information corresponding to the size of objects, surface norm data and others.

Based on the learning, the domain adaptation module 70 generates or updates a domain adaptation model 92 for the target domain, which can be used to analyze a selected image from the target domain. For example, the domain adaptation module 70 can apply the selected image to the domain adaptation model 92, generate characterization data (e.g., object labels), and output a characterized image 94 including, for example, the selected image and object labels. The selected image may be a real time image (e.g., taken during vehicle operation) or a stored image. The selected image may be multiple images and/or video images.

The model provides an improvement over conventional techniques and provides more accurate classification and/or segmentation of an image. For example, if an image is not associated with depth information, the model may still be able to provide depth information based on the domain adaptation model 92.

Figure 4:
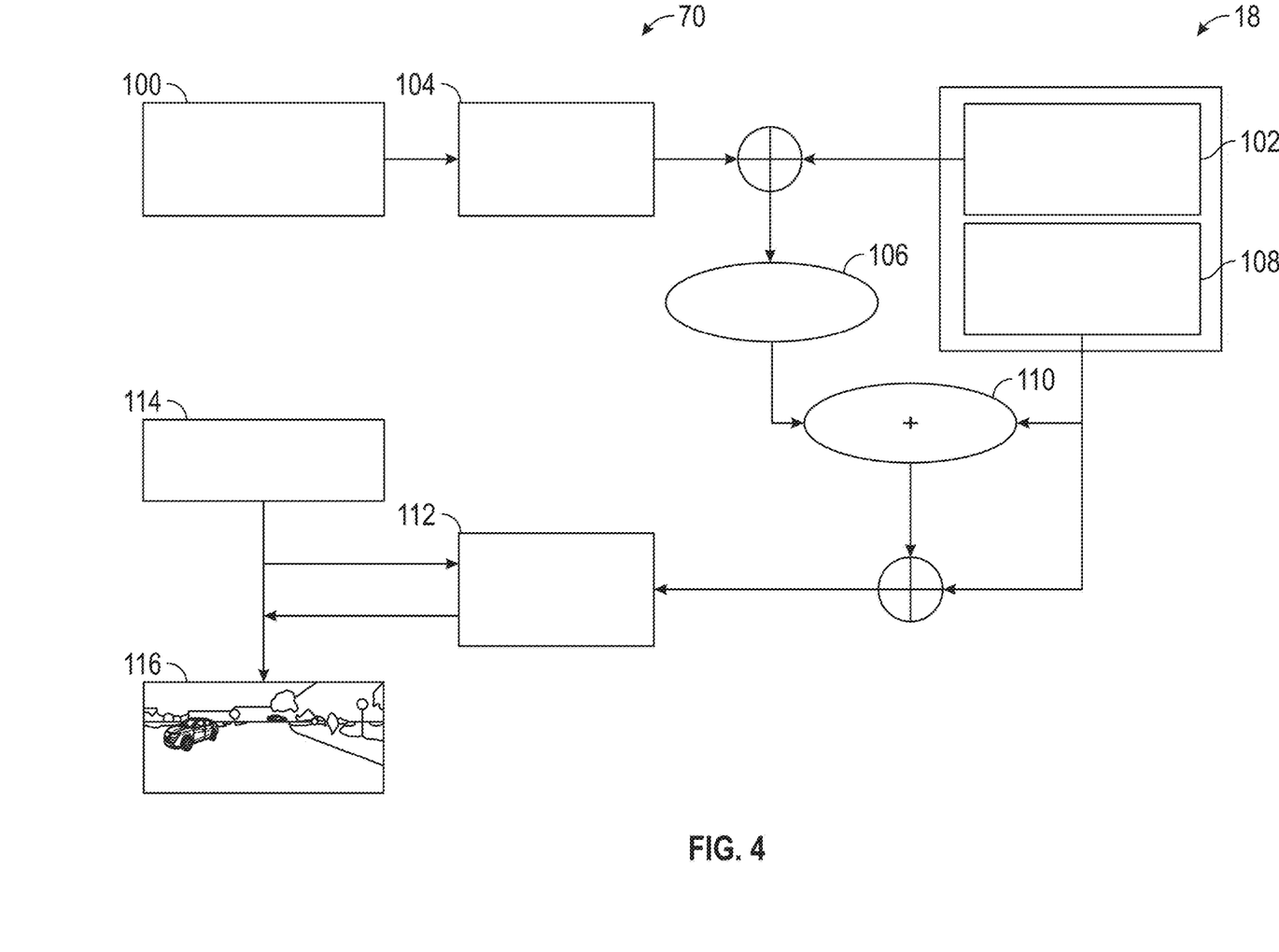
FIG. 4 depicts an image analysis system configured to generate and/or train a domain adaptation model and characterize image data, in accordance with an exemplary embodiment.
Figure 5:
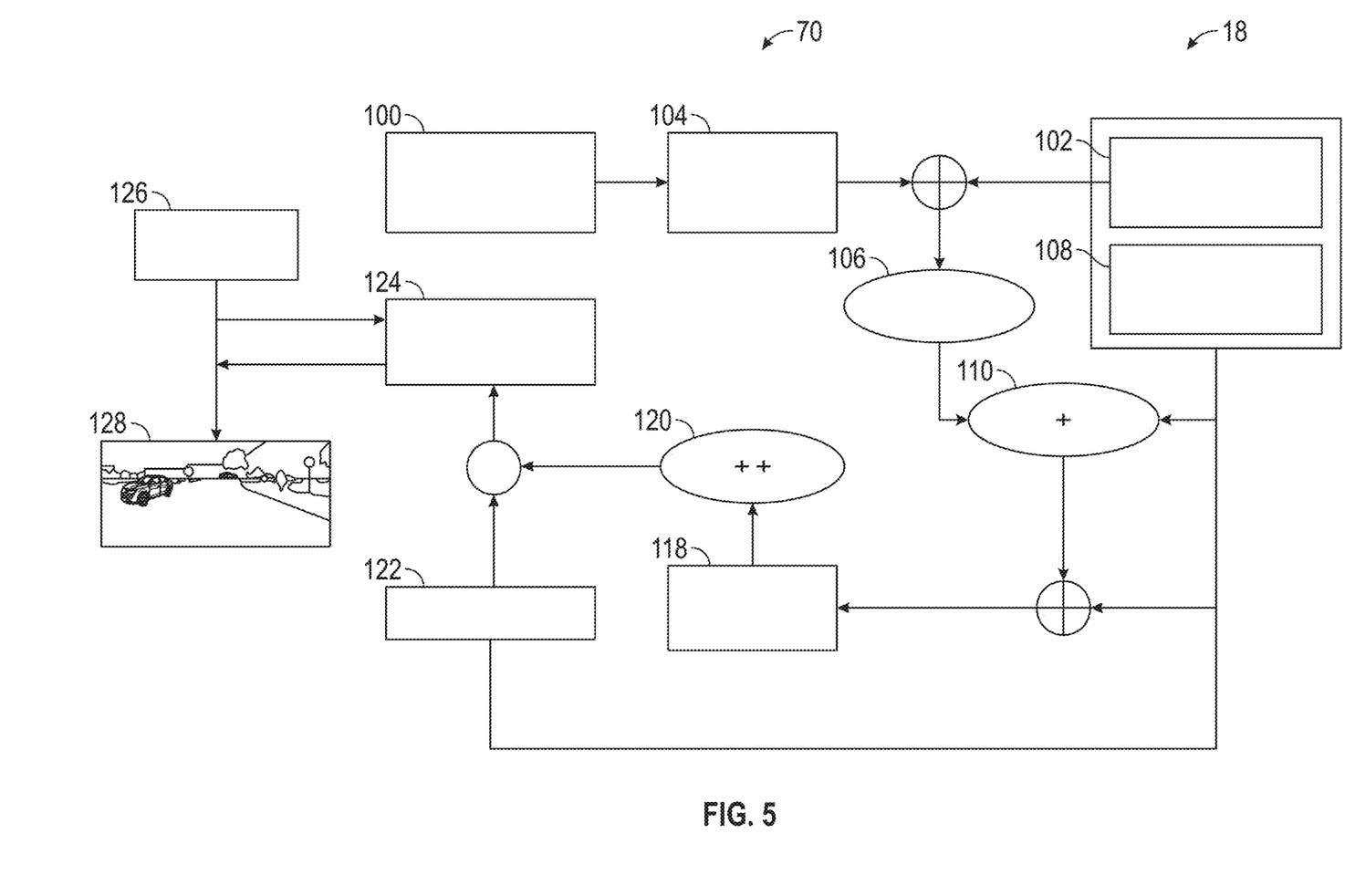
FIG. 5 depicts an image analysis system configured to generate and/or train a domain adaptation model and characterize image data, in accordance with an exemplary embodiment.

FIGS. 4 and 5 illustrate aspects of additional embodiments of the image analysis system 18. Generally, in these embodiments, the image analysis module 70 acquires a source domain image and available source domain characterization data, such as object labels. A self-training algorithm (or other suitable machine learning algorithm) trains a domain adaptation model using a neural network and generates pseudo labels having high levels of confidence.

Referring to FIG. 4, training data 100 in the form of one or more optical color (RGB) images and associated labels are input to the domain adaptation module 70 (or other suitable processing device or unit). The training data 100 is taken from a first domain (a source domain). For example, the images 100 may be taken from a first geographic region and/or a first temporal domain. One or more RGB images 102 from a target domain are acquired. The images 100 and 102 are input to a neural network (NN) 104 such as a deep learning neural network (DNN). A machine learning algorithm such as a supervised learning algorithm uses the NN 104 to compare training data to the images 102 and generate pseudo labels. In one embodiment, the learning algorithm is a semi-supervised learning algorithm, which uses labeled images from the training data 100 for supervised learning. Labeled data points are compared to unlabeled data points or regions to generate an approximate label referred to as a pseudo label 106. The pseudo label may 106 be associated with a level of confidence. In some cases, a pixel or region of an image may be tentatively labeled with multiple pseudo labels depending on the confidence level.

Additional information such as ground truth data 108 taken in the target domain may be input to the model (e.g., radar or lidar images) to update the model and modify existing pseudo labels or generate new pseudo labels having higher confidences. These pseudo labels are referred to as improved pseudo labels 110. The improved pseudo labels 110 are incorporated into a domain adaptation model 112. Other images 114 taken in the target domain may then be applied to the model 112 to generate a labeled image 116.

Referring to FIG. 5, if depth data is available, the improved pseudo labels 110 and the image and the ground truth data 118 may be input to the model and used to train the model using a DNN 118 that incorporates both image, ground truth and depth data. Further improved pseudo labels 120 (having a higher confidence level than the previous pseudo labels 110) along with associated confidence levels 122 are input to a domain adaptation model 124 that incorporates depth data. One or more images 128 acquired in the target domain can be classified and otherwise analyzed using the model 124 to generate labels and/or other characterization data 126.

Various embodiments of the systems and methods described herein may use machine learning classifiers to identify and/or classify features of an image to generate labels and other characterization data. Generally, a classifier is a processing module or algorithm configured to analyze measurement and image data and determine whether the data falls into a class. The classifier may be configured to determine whether data falls into a single class, falls into one of two classes, or falls into one of three or more classes. Examples of classes include different types of objects (e.g. cars, people, surfaces, structures, etc.), weather condition classes, depth classes, speed classes and others. A class can be established by training the classifier using images and acquired characterization data as training data. In one embodiment, each classifier uses a neural network (NN).

Figure 6:
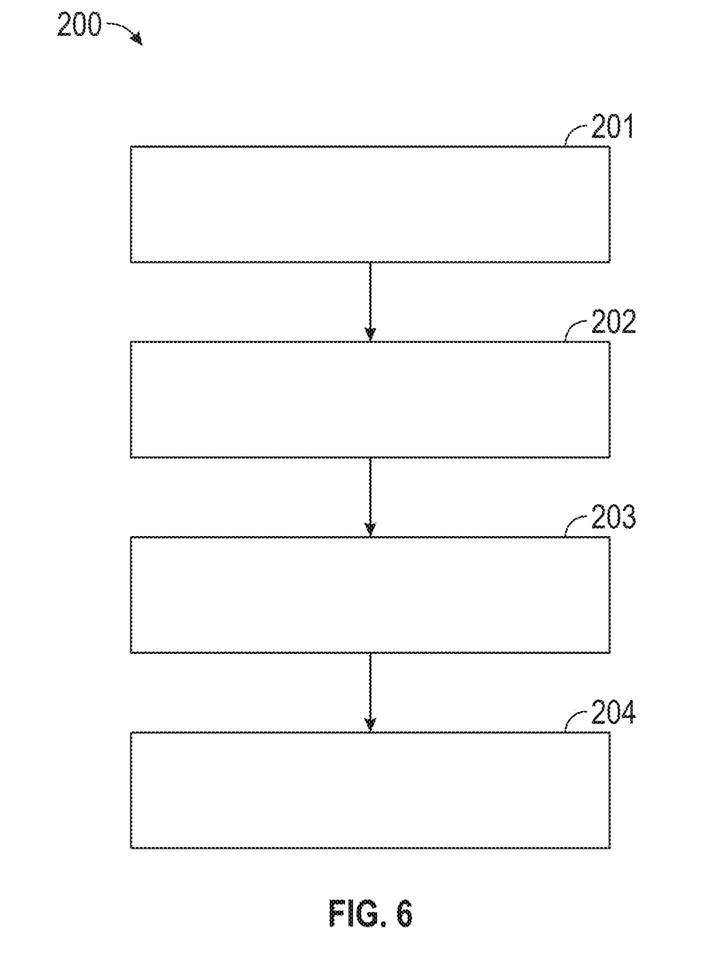
FIG. 6 is a flow chart depicting aspects of a method of analyzing images based on a domain adaptation model, in accordance with an exemplary embodiment.

FIG. 6 depicts an embodiment of a method 200 of analyzing image data. The image analysis system 18 and/or the domain adaptation module 70, or other processing device or system, may be utilized for performing aspects of the method 200. The method 200 is discussed in conjunction with blocks 201-204. The method 200 is not limited to the number or order of steps therein, as some steps represented by blocks 201-204 may be performed in a different order than that described below, or fewer than all of the steps may be performed.

At block 201, image data from a target domain (target domain image data) is received by, for example, a receiving module. For example, the receiving module receives a RGB image taken (e.g., by a vehicle camera).

At block 202, a domain adaptation model is trained using a machine learning algorithm based on one or more previously acquired target domain images, and one or more images taken in a source domain. The source domain images may be accompanied by characterization data such as object or feature labels. The model is trained using, for example, a deep learning or multi-task learning algorithm and a neural network. Additional target domain characterization data may be acquired if available (e.g., ground truth data from radar sensors) and used to improve or update the model as discussed above.

At block 203, the target domain image is classified by inputting the target domain image to the model. The target image may be classified using the model alone, or in combination with any available information. The classified target domain image may be accompanied by characterization data such as semantic segmentation labels, and other information such as depth and speed labels.

At block 204, the classified target domain image is output to a suitable location, for example, to store the target domain image and/or display the image to a user. For example, the classified image can be stored in a database or other suitable location for various uses, such as further training, vehicle diagnostics, mapping and others. In one example, the classified image is output to a vehicle control processor such as a control unit for autonomous vehicle operation and/or driver assist.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system for analyzing images, comprising:
a processor including a receiving module configured to receive an image associated with a target domain;
a domain adaptation module configured to characterize one or more features represented in the received image based on a domain adaptation model, the domain adaptation model generated using a machine learning algorithm to train the domain adaptation model, the machine learning algorithm configured to train the domain adaptation model based on one or more source domain images associated with a source domain, one or more previously acquired images associated with the target domain, and acquired characterization data associated with the target domain, the one or more source domain images having one or more source domain classification labels assigned to one or more features of the one or more source domain images, the machine learning algorithm configured to generate a target domain classification label based on comparing the one or more features to the one or more previously acquired images associated with the target domain; and
an output module configured to output the received image with characterization data identifying one or more features characterized by the domain adaptation module.

2. The system of claim 1, wherein the source domain includes at least one of a first geographic scenario and a first temporal scenario, and the target domain includes at least one of a second geographic region and a second temporal scenario.

3. The system of claim 1, wherein the source domain is associated with data acquired via a first modality and the target domain is associated with data associated with a second modality.

4. The system of claim 3, wherein the data associated with the first modality includes optical image data, and the data associated with the second modality includes optical image data and ground truth data acquired from another sensor.

5. The system of claim 1, wherein processor is configured to train the domain adaptation model by:
acquiring the one or more source domain images and the one or more source domain characterization labels associated with the one or more source domain images, and classifying the one or more features and generating a pseudo label having a first level of confidence based on a first model; and
applying the acquired characterization data to the first model to generate an updated model, and generating a second pseudo label having a second level of confidence, the second level of confidence being greater than the first level of confidence.

6. The system of claim 5, wherein the acquired characterization data includes ground truth data acquired from one or more sensors.

7. The system of claim 5, wherein the processor is configured to train the domain adaptation model by:
acquiring depth data associated with the target image in the target domain; and
applying the acquired depth data to the updated model, and generating a third pseudo label having a third level of confidence that is greater than the second level of confidence.

8. The system of claim 1, wherein the processor is configured to train the domain adaptation module using a multi-task learning algorithm, the multi-task learning algorithm configured perform a first task that includes characterizing the one or more features based on image data, and a second task that includes characterizing the one or more features based on additional data in the target domain.

9. The system of claim 1, wherein the processor is configured to train the domain adaptation model by acquiring the one or more source domain images and the one or more source domain classification labels associated with the one or more source domain images, comparing labeled data points of the one or more source domain images to unlabeled data points of the one or more previously acquired images associated with the target domain, and generating a pseudo label having a level of confidence based on the comparison.

10. The system of claim 1, wherein the machine learning algorithm is a deep learning algorithm configured to cause the processor to generate the domain adaptation model using a neural network.

11. A method of analyzing images, comprising:
receiving an image associated with a target domain;
characterizing one or more features represented in the received image by a domain adaptation module based on a domain adaptation model, the domain adaptation model generated using a machine learning algorithm to train the domain adaptation model, the machine learning algorithm configured to train the domain adaptation model based on one or more source domain images associated with a source domain, one or more previously acquired images associated with the target domain, and acquired characterization data associated with the target domain, the one or more source domain images having one or more source domain classification labels assigned to one or more features of the one or more source domain images, the machine learning algorithm configured to generate a target domain classification label based on comparing the one or more features to the one or more previously acquired images associated with the target domain; and outputting the received image with characterization data identifying one or more features characterized by the domain adaptation module.

12. The method of claim 11, wherein the source domain includes at least one of a first geographic scenario and a first temporal scenario, and the target domain includes at least one of a second geographic region and a second temporal scenario.

13. The method of claim 11, wherein the source domain is associated with data acquired via a first modality and the target domain is associated with data associated with a second modality.

14. The method of claim 13, wherein the data associated with the first modality includes optical image data, and the data associated with the second modality includes optical image data and ground truth data acquired from a sensor.

15. The method of claim 11, further comprising training the domain adaptation model, the training including:

acquiring the one or more source domain images and the one or more source domain characterization labels associated with the one or more source domain images, and classifying the one or more features and generating a pseudo label having a first level of confidence based on a first model; and applying the acquired characterization data to the first model to generate an updated model, and generating a second pseudo label having a second level of confidence, the second level of confidence being greater than the first level of confidence.

16. The method of claim 15, wherein the acquired characterization data includes ground truth data acquired from one or more sensors.

17. The method of claim 15, wherein training the domain adaptation model includes:

acquiring depth data associated with the target image in the target domain; and applying the acquired depth data to the updated model, and generating a third pseudo label having a third level of confidence that is greater than the second level of confidence.

18. The method of claim 11, further comprising training the domain adaptation model using a multi-task learning algorithm, the multi-task learning algorithm configured perform a first task that includes characterizing the one or more features based on image data, and a second task that includes characterizing the one or more features based on additional data in the target domain.

19. The method of claim 11, wherein the acquired characterization data is selected from at least one of radar data and lidar data.

20. The method of claim 11, wherein the machine learning algorithm is a deep learning algorithm configured to cause the processor to generate the domain adaptation model using a neural network.

* * * * *